United States Patent
Gole et al.

(10) Patent No.: US 12,360,217 B2
(45) Date of Patent: Jul. 15, 2025

(54) TECHNIQUES FOR SYNCHRONIZATION TO IMPROVE SCANS IN FMCW LiDAR SYSTEMS

(71) Applicant: Aeva, Inc., Mountain View, CA (US)

(72) Inventors: Amol V. Gole, Sunnyvale, CA (US); Gaylon R. Lovelace, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 516 days.

(21) Appl. No.: 17/849,366

(22) Filed: Jun. 24, 2022

(65) Prior Publication Data
US 2022/0381887 A1 Dec. 1, 2022

Related U.S. Application Data

(63) Continuation of application No. 17/333,281, filed on May 28, 2021, now Pat. No. 11,402,475.

(51) Int. Cl.
| | | |
|---|---|---|
| G01S 7/481 | (2006.01) | |
| G01S 7/4912 | (2020.01) | |
| G01S 17/89 | (2020.01) | |

(52) U.S. Cl.
CPC .......... *G01S 7/4817* (2013.01); *G01S 7/4912* (2013.01); *G01S 17/89* (2013.01)

(58) Field of Classification Search
CPC ........ G08G 1/166; G08G 1/04; G01S 7/4972; G01S 7/4815; G01S 17/42; G01S 7/4861; G01S 7/4863; G01S 17/931; G01S 7/484; G01S 7/4868; G01S 17/93; G01S 7/486; G01S 7/4814; G01S 17/10; G01S 7/4812; G01S 7/4816; G01S 17/89; G01S 7/4876; G01S 17/04; G01S 7/4808; G01S 7/4817; G01S 7/497; B60Q 1/0023; B60Q 1/26; G02B 26/0858; G02B 26/10; G05D 1/024; G05D 2201/0213
See application file for complete search history.

(56) References Cited

U.S. PATENT DOCUMENTS

| | | | |
|---|---|---|---|
| 5,638,164 A * | 6/1997 | Landau | G01S 7/4802 356/5.01 |
| 2018/0113200 A1* | 4/2018 | Steinberg | G01S 17/93 |
| 2019/0098469 A1 | 3/2019 | Oh et al. | |
| 2019/0383911 A1* | 12/2019 | Zhang | G02B 26/0816 |
| 2021/0109197 A1* | 4/2021 | O'Keeffe | G01S 7/497 |
| 2021/0231781 A1 | 7/2021 | Takashima et al. | |

* cited by examiner

*Primary Examiner* — Luke D Ratcliffe
(74) *Attorney, Agent, or Firm* — Herbert Freehills Smith Kramer (US) LLP

(57) ABSTRACT

Embodiments of the present disclosure include techniques for synchronizing certain components within a light scanning system in order to align periodicities and efficiently produce more reliable scan frames. For instance, embodiments include an optical source to transmit an optical beam modulated at a first periodicity, and an optical scanner to direct the optical beam at a second periodicity, and a signal processing system to perform periodic temporal alignments between the first periodicity and the second periodicity to produce stable grid points in region of interest (ROI). The system effectively removes the unaligned grid points and can be applied to any light detection and ranging (LiDAR) systems or other optical scanning applications.

20 Claims, 11 Drawing Sheets

TECHNIQUES FOR SYNCHRONIZATION TO IMPROVE SCANS IN FMCW LiDAR SYSTEMS

RELATED APPLICATIONS

This is a continuation of application Ser. No. 17/333,281, filed May 15, 2021.

TECHNICAL FIELD

The present disclosure relates generally to light scanning systems, and more particularly to light detection and ranging (LiDAR) systems utilizing laser scanning mechanisms.

BACKGROUND

When a light source is combined with a raster mechanism, a two-dimensional image can be created or two-dimensional information can be collected. In order to perform a measurement or to send information, the light source is modulated with certain electrical current patterns. The raster mechanism is also driven to perform a certain periodic scan. Ideally, the light modulation and the optical scanning are synchronized by a common trigger so that well-defined two-dimensional grid points can be obtained. However, when both the modulation of the light source and the raster mechanism cannot be instantly timed or triggered, systematic timing errors are produced, resulting in unaligned grid points between scan frames processed in a light scanning system. Moreover, these unaligned grid points can also negatively impact the effectiveness, quality, and/or performance of downstream operations such as object detection and/or tracking.

SUMMARY

The present disclosure describes a periodic synchronization technique to minimize or eliminate unaligned grid points found in one or more scan frames processed in a light scanning system. This technique can be applied to, for instance, LiDAR systems to perform distance measurement or other systems employing one or more light scanners configured to perform dynamic synchronizations of a light source.

In one example, the light system according to the present disclosure includes an optical scanner, a light source and a signal processing system. The light source is modulated with a first periodicity. The optical scanner is driven to scan the light from the light source with a second periodicity. The signal processing system can send a timing signal to cause periodic temporal alignments between the first and the second periodicities.

In one example, the light system according to the present disclosure includes an optical scanner, a light source and a signal processing system. The light source is modulated with a first periodicity. The optical scanner is driven to scan the light from the light source with a second periodicity. The signal processing system sends a timing signal to cause periodic temporal alignments between the first and the second periodicities. The signal processing system relies on the information from a position sensor to detect the current position of the optical scanner. The signal processing system includes a DSP and a memory to perform a finite state machine.

In one example, the light system according to the present disclosure is a subsystem of a LiDAR, including an optical scanner, a light source and a signal processing system. The light source is modulated with a first periodicity. The optical scanner is driven to scan the light from the light source with a second periodicity. The signal processing system sends a timing signal to cause periodic temporal alignments between the first and the second periodicities. The optical source is modulated to produce frequency-modulated continuous-wave.

In one example, the light system according to the present disclosure is a subsystem of a LiDAR, including an optical scanner, a light source and a signal processing system. The light source is modulated with a first periodicity. The optical scanner is driven to scan the light from the light source with a second periodicity. The signal processing system sends a timing signal to cause periodic temporal alignments between the first and the second periodicities. The optical source is pulsed or otherwise modulated to produce signals appropriate for time-of-flight measurements.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Figure 1:
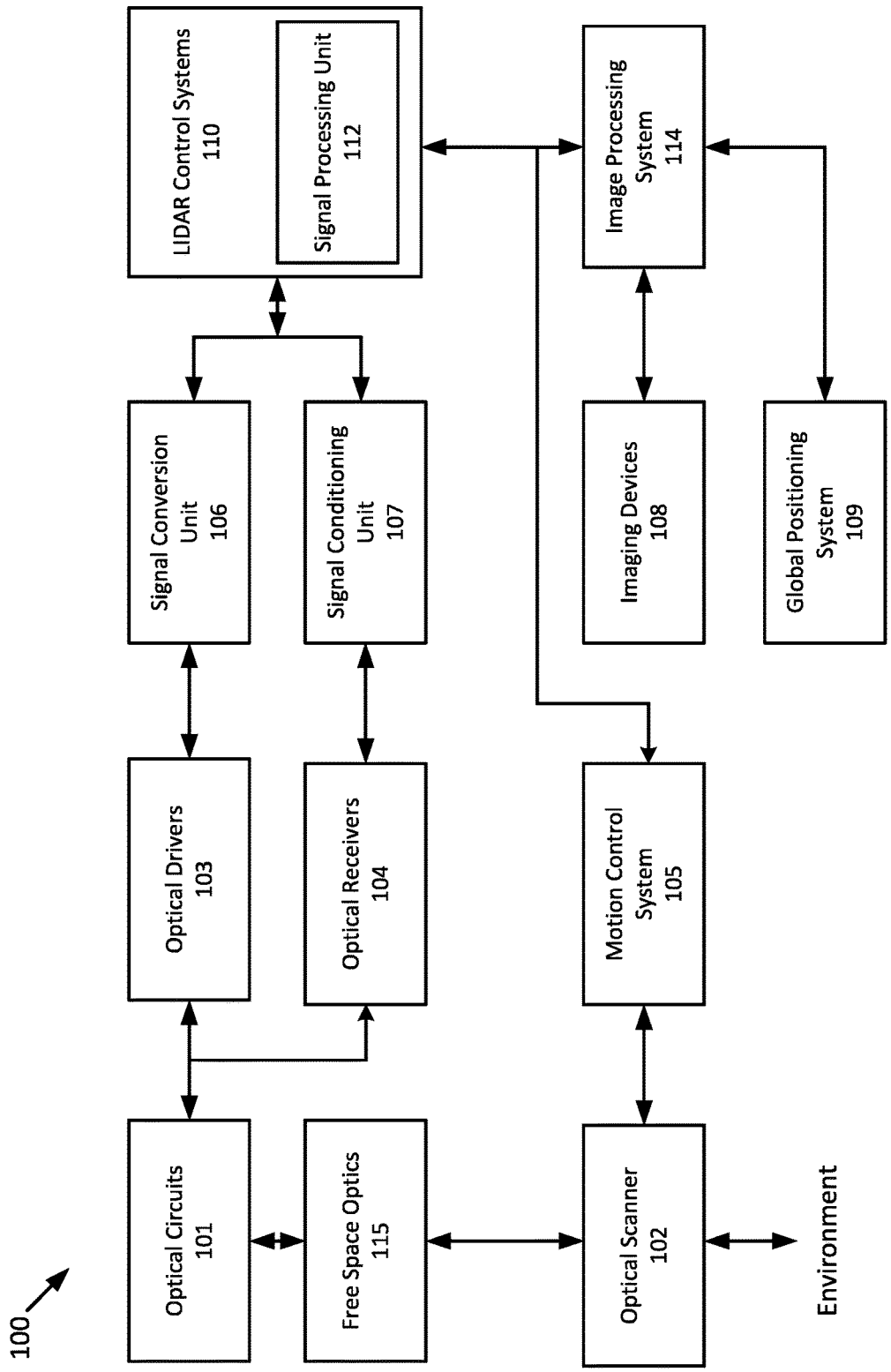
FIG. 1 is a block diagram illustrating an exemplary light scanning system performing synchronization procedures in accordance with embodiments of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Without limiting the scope of the present invention, embodiments of the disclosure provide examples implemented in LiDAR systems. According to some embodiments, the described LiDAR system may be implemented in any sensing market, such as, but not limited to, transportation, manufacturing, metrology, medical, augmented reality, virtual reality, and security systems. In some scenarios, a LiDAR system may employ pulse-based LiDAR technologies (e.g., Time-of-Flight (ToF)), Frequency-Modulated Continuous-Wave (FMCW), or similar technologies. According to some embodiments, the described LiDAR system is implemented as part of a front-end of FMCW device that assists with spatial awareness for automated driver assist systems, or self-driving vehicles.

FIG. 1A illustrates a light scanning system 100 for performing scan synchronization procedures described in accordance with embodiments of the present disclosure. The light scanning system 100 includes one or more of each of a number of components, but may include fewer or additional components than shown in FIG. 1A. One or more of the components depicted in FIG. 1A can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), beam splitters (BS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the light scanning system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the light scanning system 100 includes LiDAR control systems 110. The LiDAR control systems 110 may include a processing device for the light scanning system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LiDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LiDAR control systems 110.

The LiDAR control systems 110 are further configured to analyze incoming digital signals. In this regard, the light scanning system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LiDAR control systems 110.

In some applications, the light scanning system 100 may additionally include one or more imaging devices 108 configured to capture images of the environment, a global positioning system 109 configured to provide a geographic location of the system, or other sensor inputs. The light scanning system 100 may also include an image processing system 114. The image processing system 114 can be configured to receive the images and geographic location, and send the images and location or information related thereto to the LiDAR control systems 110 or other systems connected to the light scanning system 100.

In operation according to some examples, the light scanning system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams from optical sources, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in light scanning system 100 may have natural reflective properties or a reflective coating to reflect a portion of the light back to the optical circuits 101.

Optical signals reflected back from the environment pass through the optical circuits 101 to the receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. The signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
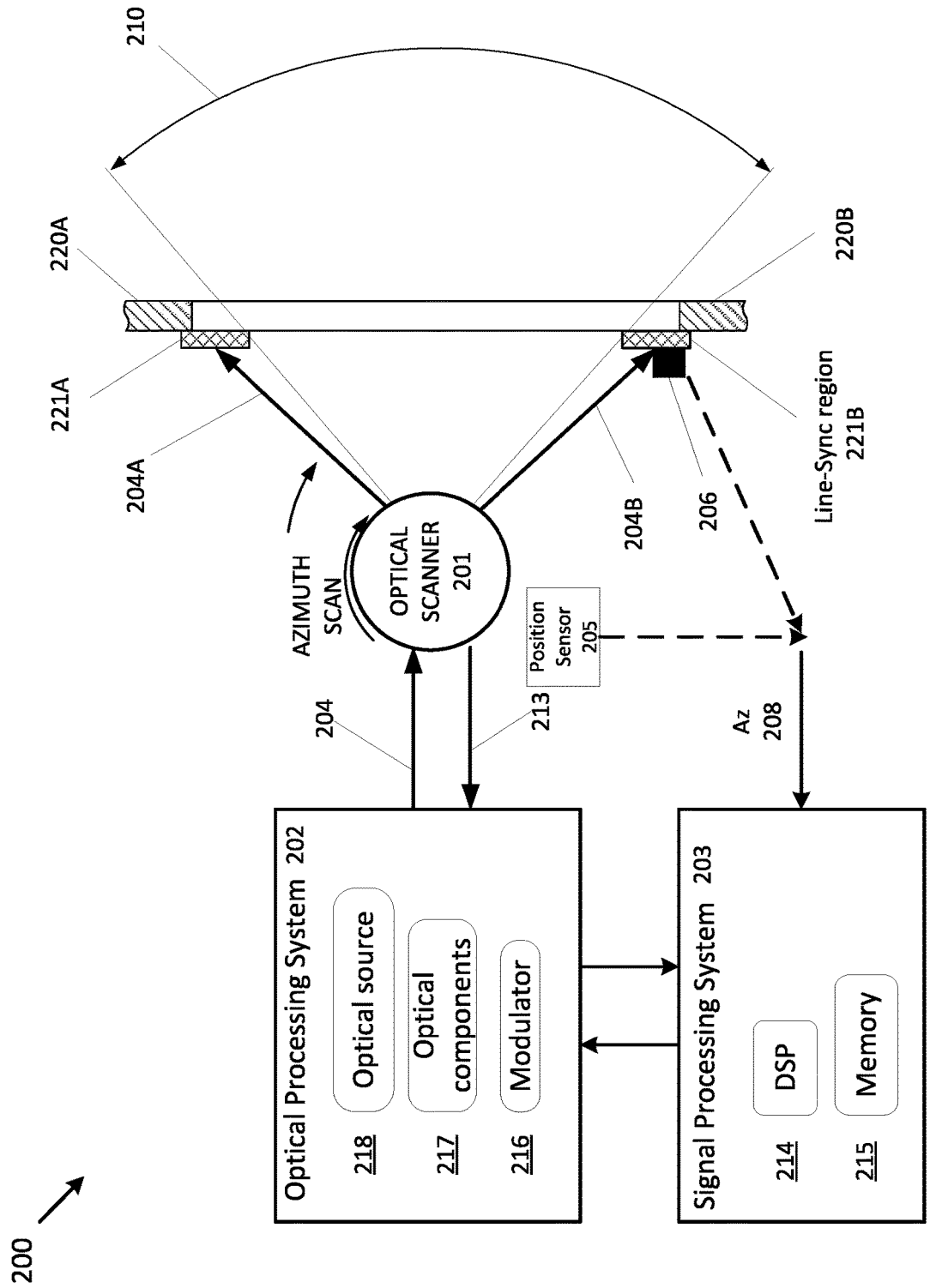
FIG. 2 is another block diagram illustrating an exemplary light scanning system performing synchronization procedures in accordance with embodiments of the present disclosure

FIG. 2 is another block diagram depicting a system 200 configured to perform synchronizations (or re-synchronizations) according to embodiments of the present disclosure. It should be noted that one or more components depicted in FIG. 2 can be a subsystem of light scanning system 100 of FIG. 1.

According to some embodiments, signal processing system 203 can be configured to include a DSP 214 and memory 215. As described herein, embodiments can be configured to determine one or more regions of interest (ROI) 210 and/or determine (e.g., calculate, compute, obtain, receive) coordinate values of scan points obtained (e.g., calculate, compute, obtain, collect, received, acquire) based on a FOV (between apertures 220A and 220B) relative to the light scanning system. As will be described in greater detail herein, embodiments of the present disclosure can efficiently produce one or more scan frames in a manner that conserves power resources.

As illustrated in FIG. 2, a DSP 214 of the light scan system 200 can be configured to identify one or more regions of interest (ROI) within a field of view (FOV) of a target window (between apertures 220A and 220B) for use in producing one or more scan frames. In some embodiments, the DSP 214 can configure the ROI to appear as a rectangular grid within the FOV. The rectangular grid can include one or more scan lines containing one or more scan points (not shown) from the FOV. In some embodiments, the DSP 214 can be configured to receive the location of the ROI from a different component either within or external to the light scanning system 200. It should be noted that embodiments are not limited to linear scans and may be configured for non-linear scan (e.g., scans performed along a curved axis).

According to some embodiments, the DSP 214 can be configured to determine whether a current power mode of the light scanning system is in a lower power mode (e.g., a "sleep" mode, "inactive" mode, "off" mode, "low power" mode, and the like) that causes one or more components of the light scanning system to consume less power resources (e.g., one or more components depicted in FIG. 1). The DSP 214 can also be configured to determine when the current power mode is a higher power mode (e.g., "active" mode, "standard" power mode, "awake" mode, "high power" mode, "on" mode, and the like) that causes one or more components of the light scanning system (e.g., light scanning system 100) to consume more power resources.

The DSP 214 can also be configured to determine whether a current scan position of a position sensor (e.g., position sensor 205, photodetector 206) is within a particular ROI within a given FOV. In some scenarios, depending on whether DSP 214 determines that a current scan position is within a ROI, the DSP 214 can selectively adjust the power level of one or more components of the light scanning system (e.g., light scanning system 100). For instance, the DSP 214 can be configured to adjust the current power level to either the lower or higher power mode in response to determinations made about a current scan being performed relative to the location of the ROI. In this fashion, the DSP 214 can be configured to allow the optical scanner 201, using a particular power level, to perform scans of the FOV.

According to some embodiments, the DSP 214 can also be configured to determine whether a synchronization procedure between certain components within the light scanning system (e.g., light scanning system 100) has occurred. For instance, in one embodiment, the DSP 214 can determine whether a synchronization procedure between the optical modulator 216 and the optical scanner 201 has already occurred (e.g., using computer/hardware memory configured to store synchronization states including, but not limited to, logic flags, internal counters, and the like.). The DSP 214 can also be configured to determine whether a current scan position, provided by position sensor 205, has reached a particular line-sync region 221A/221B (e.g., threshold, area, location, spot, and the like) which precedes the next expected entry into the ROI, as will be described herein in greater detail. In some scenarios, this line-sync region can be pre-determined by the DSP 214 and consist of one or more scan points and/or scan lines, as described herein. The coordinates of a line-sync region can be stored in the various types of memory described herein.

According to some embodiments, the DSP 214 can be configured to send one or more control signals to a modulator (e.g., modulator 216) resident on the light scanning system (e.g., light scanning system 100). In some embodiments, the modulator 216 can be an active modulator or a passive modulator. In some scenarios, the DSP can be configured to send a control signal based on a determination of whether the line-sync region 221A/221B has been reached and/or a synchronization procedure has been performed, as will be described in greater detail herein.

According to some embodiments, modulator 216, upon receipt of one or more control signals from the DSP 214, can be configured to reset a phase of one or more optical beams transmitted from the light scanning system (e.g., light scanning system 100). In turn, these one or more optical beams can be transmitted according to an updated (e.g., new) chirp periodicity that is different from a previous chirp periodicity performed prior to the modulator 216 receiving control signals from the DSP 214.

Although DSP 214 is used for illustration, embodiments of the present disclosure are not limited as such. For instance, the systems described herein may include, but are not limited microprocessor units (MCU), field programmable gate arrays (FPGA), application-specific integrated circuits (ASIC) and central processing units (CPU).

In some scenarios, memory 215 can be configured to store instruction code for DSP 214 to load and execute accordingly. According to some embodiments, memory 215 can be any form of computer memory or semiconductor memory including, but not limited to, random access memory (RAM), read only memory (ROM), dynamic random access memory (DRAM), static random access memory (SRAM), flash memory or mass storage media such as hard drive disc and/or the like. In some embodiments, memory 215 can reside within light scanning system 100 (e.g., within LiDAR Control System 110).

According to some embodiments, optical processing system 202 may include one or more optical sources (e.g., optical source 218), modulator 216, elements of free space optics 115, optical circuits 101, optical drivers 103 and optical receivers 104 in light scanning system 100. According to some embodiments, an optical source 218 (e.g., one or more lasers) of the light scan system 200 can be configured to produce and transmit, towards a target environment within the FOV between apertures 220A and 220B, an optical beam 204 according to a particular chirp periodicity.

Also, as shown in FIG. 2, an optical scanner 201, coupled to one or more components of the optical processing system 202 (e.g., the optical source 218), can be configured to scan a current azimuth and elevation coordinate within a current scan line (not pictured) from the FOV between apertures 220A and 220B using a current power mode. In some embodiments, photodetector 206 may be configured to be placed near a system aperture to detect one or more scan beams (such as 204B).

According to some embodiments, position sensor 205 may be an optical sensing device such as, but not limited to, an optical encoder, an optocoupler a photodetector or the like. As shown in FIG. 2, the position sensor 205 can be configured to communicate a current scan position of the optical scanner 201 (e.g., azimuth coordinate, elevation coordinate, and the like) to the DSP 214. In this fashion, the DSP 214 can be configured to determine whether the current scan position is within a particular ROI.

Figure 3:
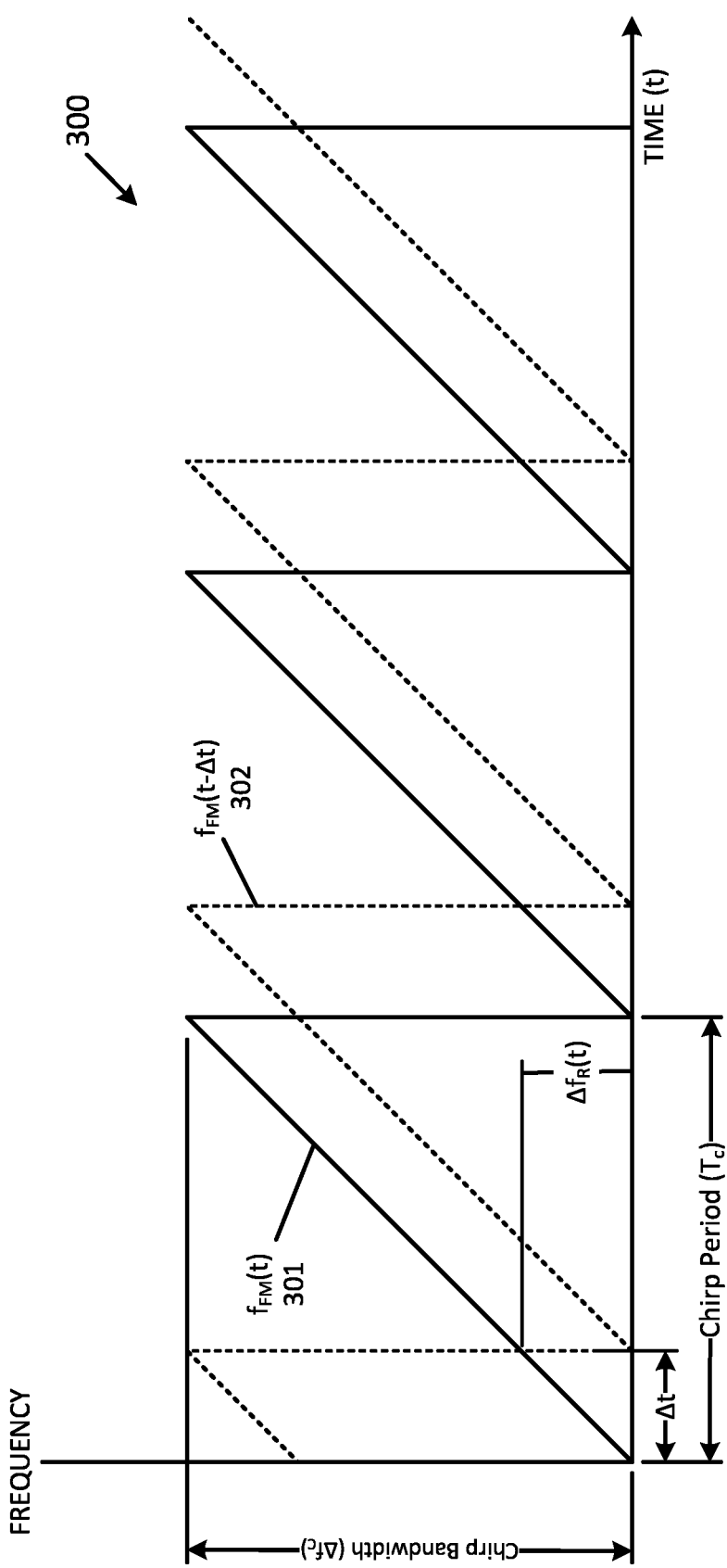
FIG. 3 is a time-frequency diagram illustrating how synchronization procedures described in accordance with embodiments of the present disclosure can be performed on a light scanning system, such as a frequency modulated continuous wave (FMCW) LiDAR system.

FIG. 3 is a time-frequency diagram 300 having an FMCW scanning signal 301 that can be used by a LiDAR system, such as system 100, to scan a target environment. In one example, the scanning waveform 301, labeled as $f_{FM}(t)$, is a sawtooth waveform (sawtooth "chirp") with a chirp bandwidth $\Delta f_c$ and a chirp period $T_c$. The slope of the sawtooth is given as $k=(\Delta f_c/T_c)$. FIG. 3 also depicts target return signal 302. Target return signal 302, labeled as $f_{FM}(t-\Delta t)$, is a time-delayed version of the scanning signal 301, where $\Delta t$ is the round trip time to and from a target illuminated by scanning signal 301. The round trip time is given as $\Delta t=2R/v$, where R is the target range and v is the velocity of the optical beam, which, in atmosphere, is approximately c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in light scanning system 100. The digitized beat frequency signal can then be digitally processed, for example, in a signal processing unit, such as signal processing unit 112 in system 100.

Figure 4:
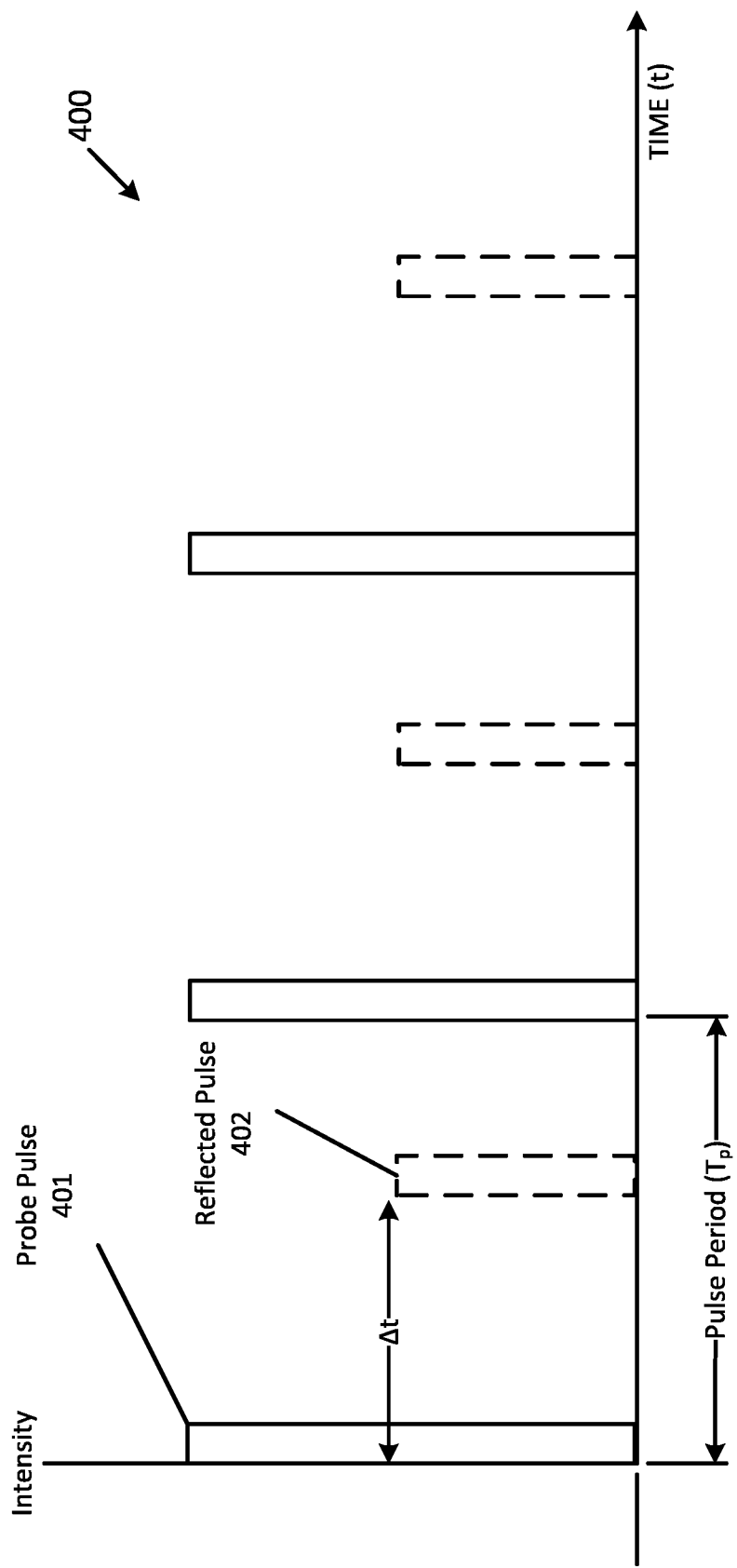
FIG. 4 is another time-frequency diagram illustrating how synchronization procedures described in accordance with embodiments of the present disclosure can be performed on a light scanning system, such as a pulse-based LiDAR system.

FIG. 4 is an intensity diagram 400 having a time-of-flight probe pulse 401 that can be used by a LiDAR system, such as system 100, to scan a target environment. In one example, the probe pulse 401, having a pulse period $T_p$. reflected pulse 402 is a time-delayed version of probe pulse 401 reflected by a target, but with much weaker intensity. The time delay $\Delta t$ is the round trip time to and from a target illuminated by probe pulse 401. The round trip time is given as $\Delta t=2R/v$, where R is the target range and v is the velocity of the optical beam, which is the speed of light c. The target range, R, can therefore be calculated as $R=c(\Delta t/2)$.

Figure 5A:
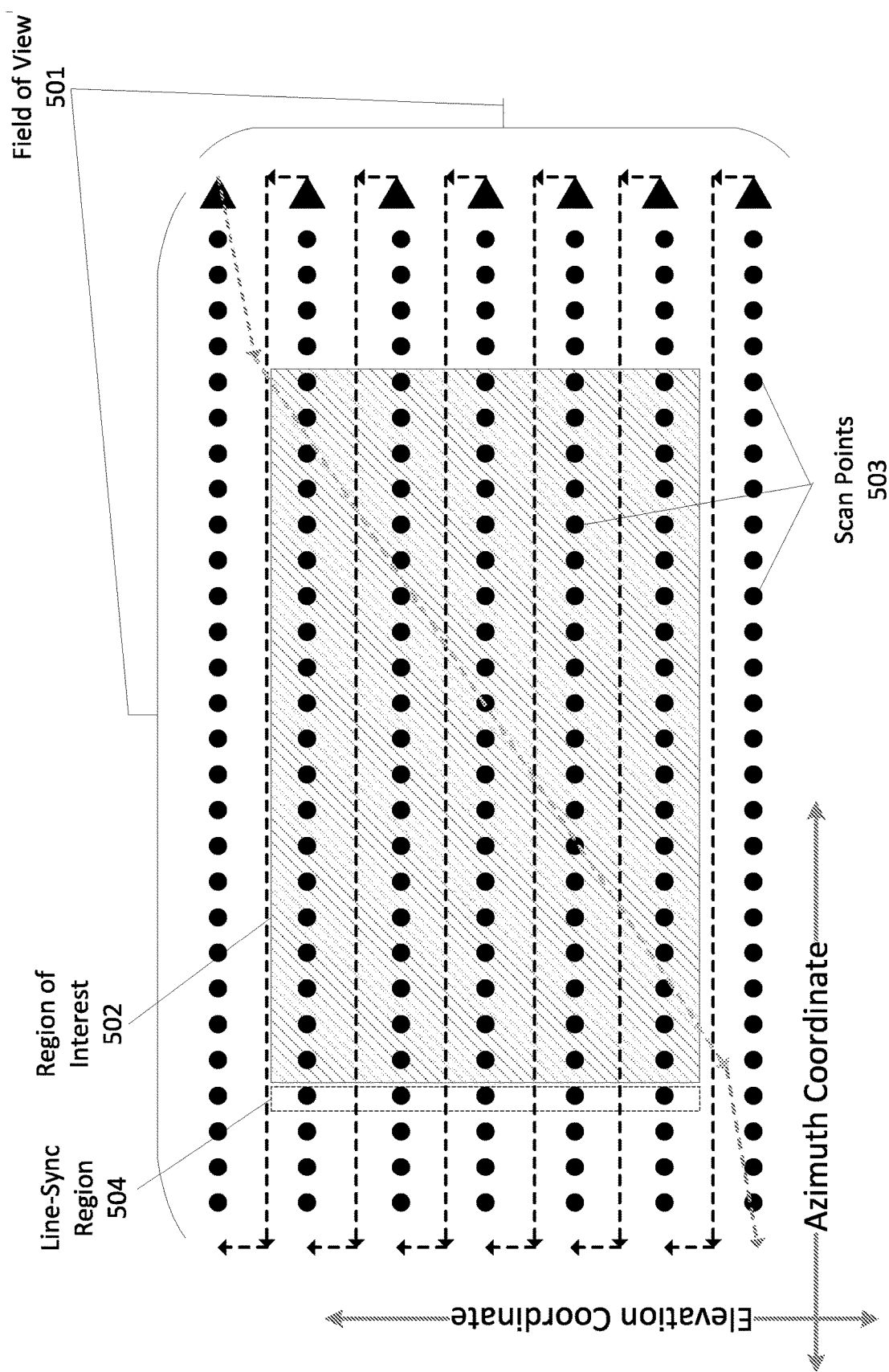
FIG. 5A is an axial view of a region of interest (ROI) within a field of view (FOV) of a light scanning system as synchronization procedures are performed in accordance with embodiments of the present disclosure.

FIG. 5A is an illustration of how synchronization procedures are performed in accordance with embodiments of the present disclosure. As depicted in FIG. 5A, DSP 214 in FIG. 2 identifies ROI 502 within a FOV 501. An optical source (e.g., optical source 218 in FIG. 2) produces and transmits an optical beam (e.g., optical beam 204 in FIG. 2) according to a particular chirp periodicity towards a target environment within the FOV 501 in a manner that results in the FOV 501. As shown in FIG. 5A, ROI 502 forms a rectangular grid within the FOV 501. The ROI 502 includes one or more scan lines containing one or more scan points from scan points 503 from the FOV 501. Also, an optical scanner (e.g., optical scanner 201 in FIG. 2) is coupled to the optical source 218 in FIG. 2 and scans one or more scan points 503 (e.g., azimuth and elevation coordinates) according to a trajectory specified by a predetermined scan pattern, as depicted by the dotted arrows in FIG. 5A. In some embodiments, the trajectory and/or pre-determined scan pattern can be stored at the light scan system 200 using one or more memories described herein.

Also, as depicted in FIG. 5A, a position sensor (e.g., position sensor 205) communicates the optical scanner's current scan position (e.g., azimuth and/or elevation coordinate) to the DSP 214. As the DSP 214 receives data from the position sensor 295, the DSP 214 determines whether the light scanning system 200 is currently operating within a lower power mode or a higher power mode. As DSP 214 receives a current azimuth and/or elevation coordinate (i.e., a scan point from scan points 503), the DSP 214 can also determine whether this current scan position is within the ROI 502.

For instance, with respect to FIG. 5A, optical scanner 201 scans each scan point in the direction of the dotted arrows and communicates this information to the DSP 214. Upon receipt of a current azimuth and/or elevation coordinate, the DSP 214 determines whether the current scan position is within the ROI 502. If so, the DSP 214 determines whether the light scanning system 200 is currently operating with a lower power mode or a higher power mode. If the light scanning system 200 is operating within a higher power mode, the DSP 214 allows the optical scanner 205 to scan one or more scan points 503 within the ROI 502 using the higher power mode. In other scenarios, if the light scanning system 200 is operating within a lower power mode, the DSP 214 correspondingly adjusts the power level of the light scanning system 200 to the higher power level. For instance, in some embodiments, the DSP 214 can send one or more control signals, to components resident on the light scanning system 200 (not pictured) that manage power resources, to cause one or more components in light scanning system 200 to consume less power. According to some embodiments, the light scanning system 200 can selectively determine a subset of components from the light scanning system 200 to have their power adjusted in the manner described herein. For instance, in one embodiment, the light scanning system 200 can selectively determine the subset based on hardware and/or software profiles of these components. In some embodiments, components that consume more or less power relative to other components can have their power adjusted before other components.

In some scenarios, upon receipt of a current azimuth and/or elevation coordinate, the DSP 214 can determine that the current scan position is not within the ROI 502. Accordingly, if the light scanning system 200 is operating within a higher power mode, the DSP 214 correspondingly adjusts the power level of the light scanning system 200 to the lower power level. For instance, in some embodiments, the DSP 214 can send one or more control signals, to components resident on the light scanning system 200 that manage power resources, to cause them to consume less power. In other scenarios, the DSP 214 determines that the light scanning system 200 is currently operating with a lower power mode. In turn, the DSP 214 allows the optical scanner 201 to scan one or more scan points 503 within the ROI 502 using the lower power mode.

According to some embodiments, the DSP 214 also determines whether a synchronization procedure between the optical source and the optical scanner has already occurred or if the current scan position has reached the line-sync region 504. For instance, in some scenarios, the DSP 214 can determine that, based on coordinate data received from the position sensor 205, the current scan position is outside of the ROI while the light scanning system 200 is currently operating in the lower power mode. Accordingly, in these conditions, the DSP 214 can determine whether a synchronization procedure between the optical modulator 216 and the optical scanner 201 has already occurred since the most recent transition from the higher power mode to the lower power mode.

The DSP 214 can also be configured to determine whether a current scan position, provided by position sensor 201, has reached a particular line-sync region 504 (e.g., threshold, area, location, spot, and the like) which precedes the next expected entry into the ROI. For instance, with reference to FIG. 5A, this line-sync region 504 can be pre-determined by the DSP 214 and consist of one or more scan points from scan points 503 that precede entry into the ROI 502. As described in greater detail in FIG. 5B, the DSP 214 can send control signals that result in a new or updated periodicity chirp signal. It should be appreciated that the scan directions depicted in FIG. 5A are for illustrative purposes and not limited as such. For instance, in some scenarios, scan directions can be in an opposite direction than those depicted in FIG. 5A or some other combination of directions.

Figure 5B:
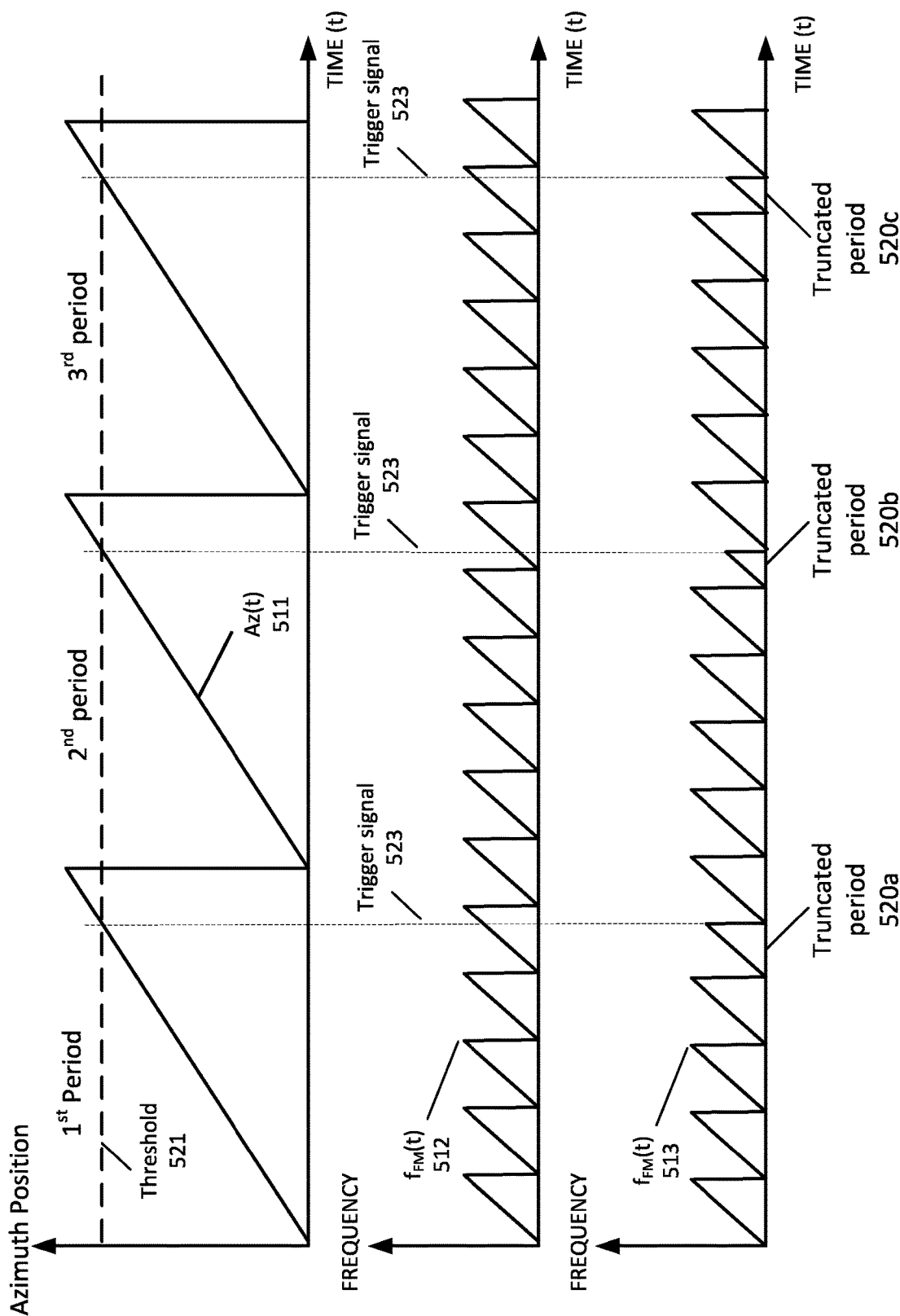
FIG. 5B is a timing diagram illustrating how synchronization procedures described in accordance with embodiments of the present disclosure can be performed on a light scanning system
Figure 6A:
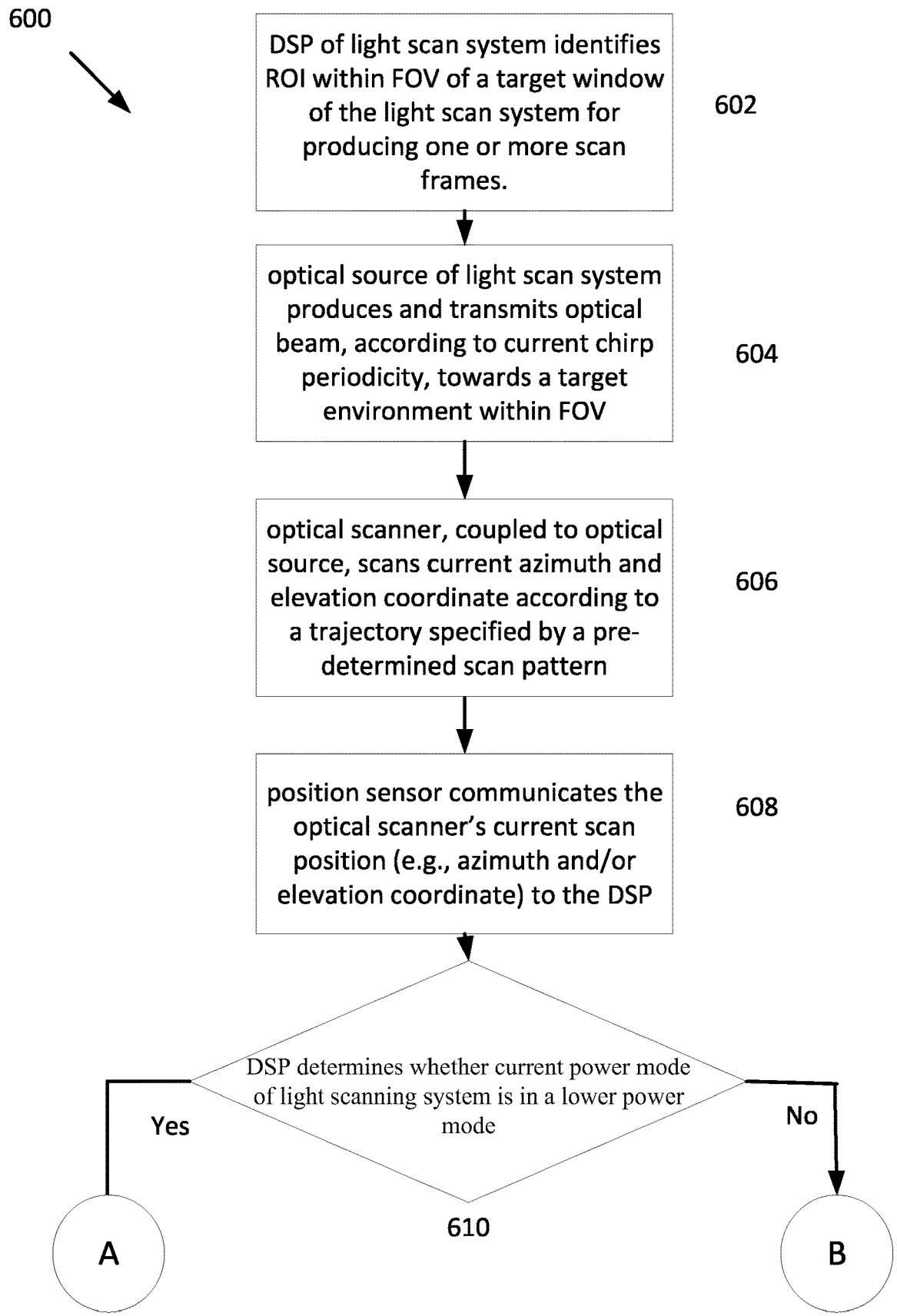
FIGS. 6A-6D is a flow chart for performing synchronizations using a light scanning system, as described herein according to some embodiments.
Figure 6B:
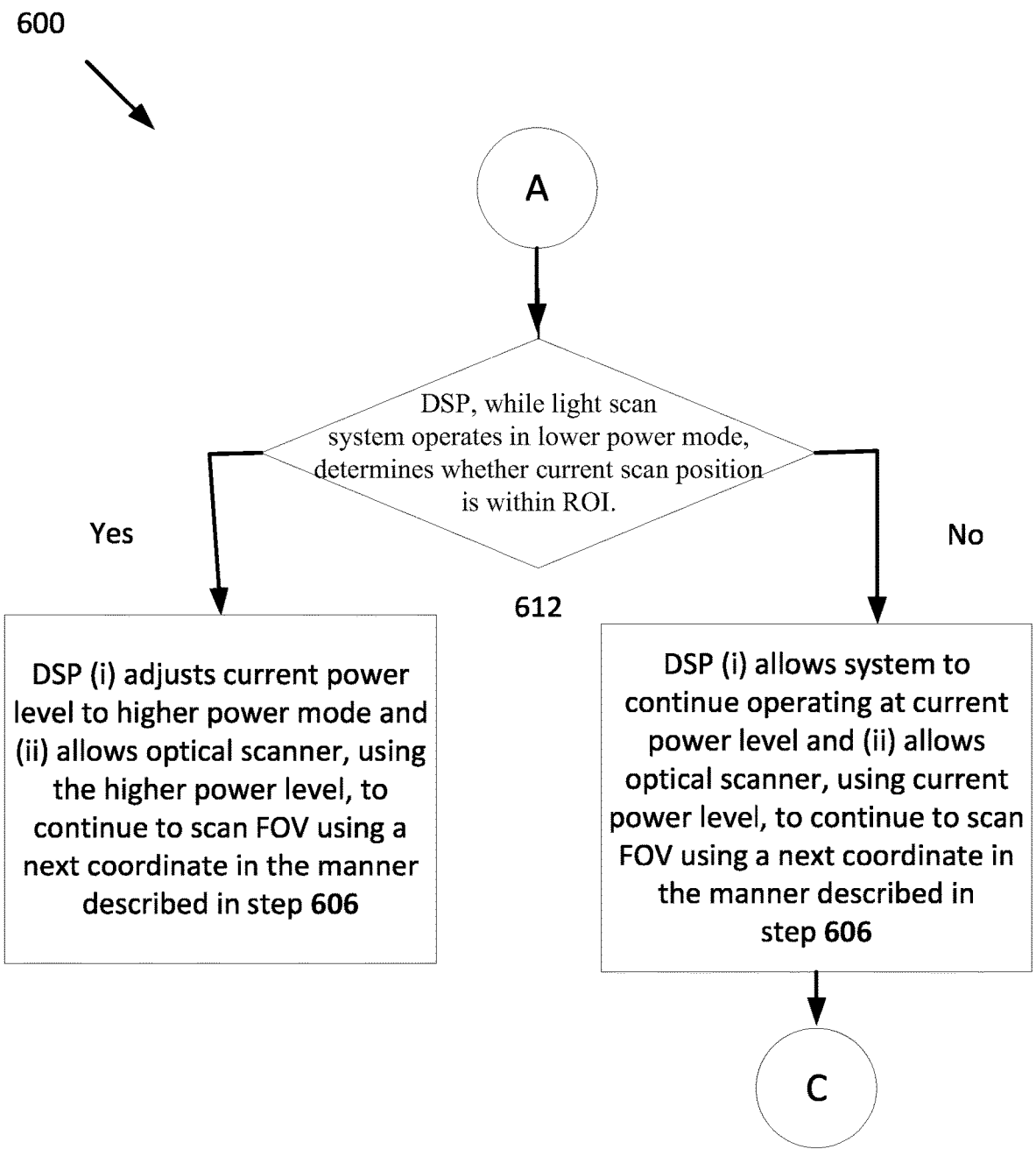
Figure 6C:
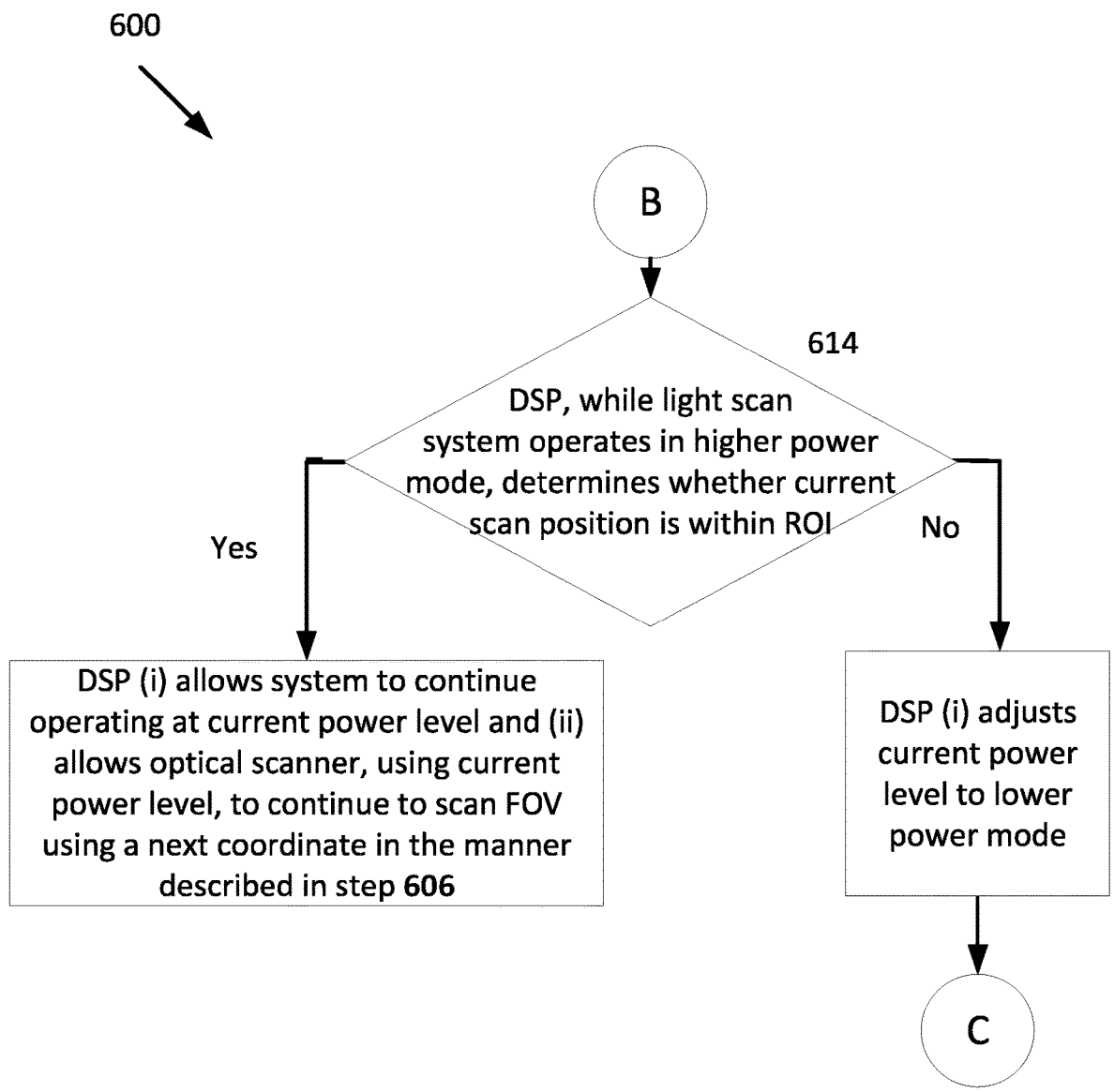
Figure 6D:
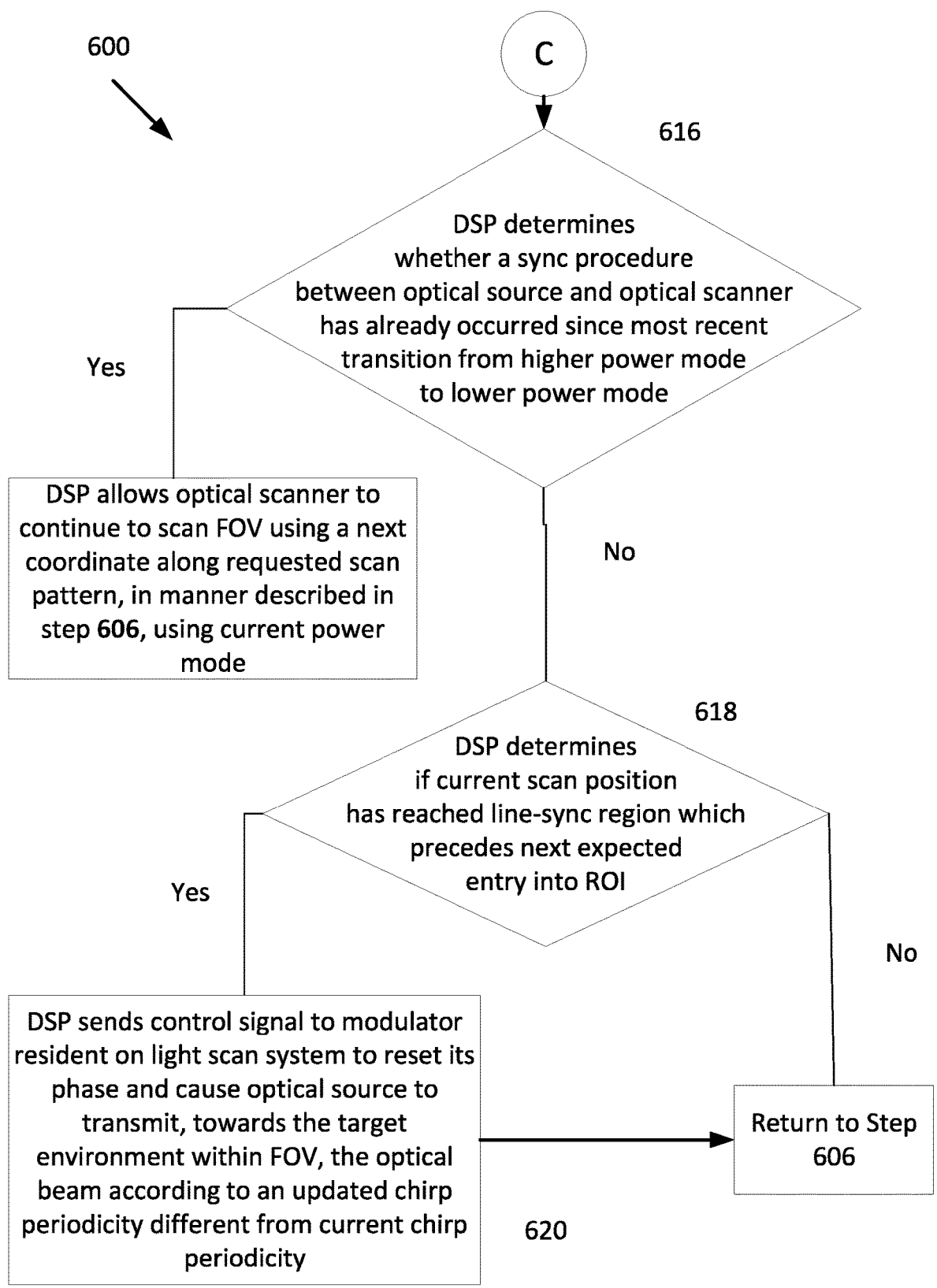

FIG. 5B illustrates how embodiments of the present disclosure can send control signals that can synchronize the periodicity of components within a light scanning system. As shown in FIG. 5B, threshold 521 represents a period during a scan at which a line-sync region (e.g., line-sync region 504) has been reached and certain conditions, such as those described in FIG. 5A, have been satisfied. As depicted in FIG. 5B, when the DSP 214 determines that a current scan position has reached the line-sync region 504 under these conditions, the DSP 214 can determine that a synchronization procedure should be performed and sends a control signal (e.g., trigger signal 523) to a modulator resident on the light scanning system (e.g., modulator 216). In turn, modulator 216 can reset its phase and cause the optical source 218 to transmit, towards the target environment within the FOV (e.g., FOV 501), an optical beam according to an updated chirp periodicity (e.g., periodicity 513 at truncated period 520a) that is different from the current chirp periodicity (e.g., periodicity 512 at truncated period 520a). As shown in FIG. 5B, the DSP 214, can send the trigger signal 523 each time a scan position is within the line-sync region 504 (e.g., periodicity 512 at truncated period 520b, periodicity 512 at truncated period 520c, etc.), provided certain conditions are satisfied as described herein. According to some embodiments, the DSP can be configured to initialize synchronization procedures within the ROI.

It should be appreciated that the thresholds depicted in FIG. 5B are for illustrative purposes, and embodiments of the present disclosure are not limited as such. In some embodiments, threshold 521 can be adjusted to provide desirable scan points within a ROI 210 of the optical system 200. This adjustment can be done based on other calibration factors during the operation, manual settings or at the system starting up. In some embodiments, threshold 521 may be used alone or in combination with another threshold. (e.g., an elevation threshold).

FIGS. 6A-6D illustrate a method 600 for performing periodic synchronizations using a light scanning system, as described herein according to some embodiments.

At step 602, a digital signal processor (DSP) of the light scan system identifies a region of interest (ROI) within a field of view (FOV) of a target window of the light scan system for producing one or more scan frames. In some embodiments, the ROI forms a rectangular grid within the FOV. The rectangular grid can include one or more scan lines containing one or more scan points from the FOV. In some embodiments, the DSP receives the location of the ROI from a different component either within or external to the light scanning system.

Next, at step 604, an optical source (e.g., one or more lasers) of the light scan system produces and transmits an optical beam, according to a current chirp periodicity, towards a target environment within the FOV.

Next, at step 606, an optical scanner, coupled to the optical source, scans a current azimuth and elevation coordinate according to a trajectory specified by a pre-determined scan pattern.

Next, at step 608, a position sensor communicates the optical scanner's current scan position (e.g., azimuth and/or elevation coordinate) to the DSP.

Next, at step 610, the DSP determines whether a current power mode of the light scanning system is in a lower power mode (e.g., a "sleep" mode, "inactive" mode, "off" mode, "low power" mode and the like). If the scanning system is in the lower power mode, then the DSP determines whether the current scan position is within the ROI, as detailed in step 612. Otherwise, the DSP (i) determines that the current power mode is a higher power mode (e.g., "active" mode, "standard" power mode, "awake" mode, "high power" mode, "on" mode, and the like) that causes one or more components of the light scanning system to consume more power resources and (ii) determines whether the current scan position is within the ROI, as detailed in step 614.

Next, at step 612, the DSP, while the light scan system operates in a lower power mode, determines whether the current scan position is within the ROI. If the current scan position is within the ROI, then the DSP (i) adjusts the current power level to the higher power mode and (ii) allows the optical scanner, using the higher power level, to continue to scan the FOV using a next coordinate in the manner described in step 606. Otherwise, the DSP (i) allows the system to continue operating at the current power level, (ii) allows the optical scanner, using the current power level, to continue to scan the FOV using a next coordinate in the manner described in step 606, and (iii) determines whether a synchronization procedure between the optical source and the optical scanner has already occurred or if the current scan position has reached the line-sync region, as described in step 616.

Next, at step 614, the DSP, while the light scan system operates in a higher power mode, determines whether the current scan position is within the ROI. If the current scan position is within the ROI, then the DSP (i) allows the system to continue operating at the current power level and (ii) allows the optical scanner, using the current power level, to continue to scan the FOV using a next coordinate in the manner described in step 606. Otherwise, the DSP (i) adjusts the current power level to the lower power mode and (ii) determines whether a synchronization procedure between the optical source and the optical scanner has already occurred or if the current scan position has reached the line-sync region, as described in step 616.

Next, at step 616, the DSP determined that (i) the current scan position is outside of the ROI and that (ii) the light scanning system is currently operating in the lower power mode. As such, the DSP determines whether (i) a synchronization procedure between the optical source and the optical scanner has already occurred since the most recent transition from the higher power mode to the lower power mode or (ii) if the current scan position has reached the line-sync region (e.g., threshold, area, and the like) which precedes the next expected entry into the ROI.

If the DSP determines that a synchronization procedure has already occurred, then the DSP allows the optical scanner to continue to scan the FOV using a next coordinate along the requested scan pattern, in the manner described in step 606, using the current power mode. If the DSP determines that a synchronization procedure has not already occurred, then the DSP determines whether the current scan position has reached the line-sync region, as described in 618.

At step 618, the DSP determines whether the current scan position has reached the line-sync region which precedes the next expected entry into the ROI. If the current scan position has reached the line-sync region, then the DSP determines that a synchronization procedure should be performed and sends a control signal to a modulator resident on the light scanning system, as described in step 620. Otherwise, the DSP allows the optical scanner to continue to scan the FOV using a next coordinate along the requested scan pattern, in the manner described in step 606, using the current power mode.

Next, at step 620, upon receiving one or more signals from the position sensor indicating that the current scan position is outside the ROI of the current scan line, the DSP sends a control signal to a modulator resident on the light scan system to reset its phase and cause the optical source to transmit, towards the target environment within the FOV, the optical beam according to an updated chirp periodicity that is different from the current chirp periodicity. The optical scanner continues to scan the FOV, as described in step 606 using the current power mode. According to some embodiments, the DSP can be configured to initialize synchronization procedures within the ROI.

Figure 7:
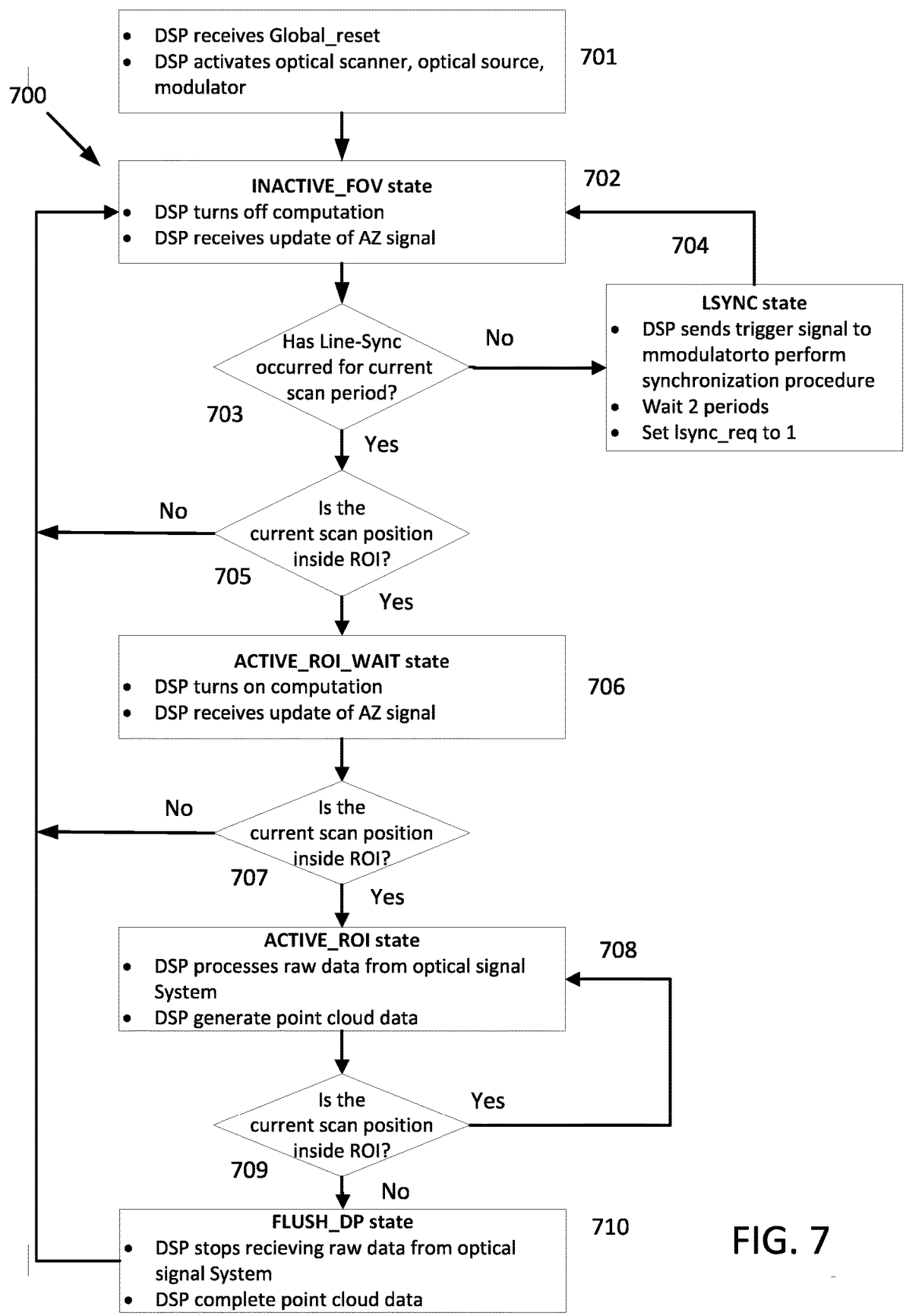
FIG. 7 is another flow chart for performing synchronizations using a light scanning system, as described herein according to some embodiments.

FIG. 7 illustrates another method for performing synchronizations using a light scanning system, as described herein according to some embodiments.

Method 700 contains several states, each state executing certain specific tasks. The transition between states is triggered by events. These events include external status, logic flags, internal counters, etc. A software or firmware implementation can be developed according to method 700 using logic circuits including memories to store the instruction codes and a digital signal processor (DSP) to execute the code. The external status, such as the position of the optical scanner, can be presented to the DSP by electrical signals. To start the operation, the DSP will load the instruction codes from the memory and execute the codes to perform the periodic synchronization routine according to the algorithm described by method 700. The details of method 700 is explained as follows along with the components depicted in FIG. 2, as previously described herein.

For instance, with reference to FIG. 2, as depicted in FIG. 7, method 700 can be implemented by the system 200, and begins at step 701. A component such as position sensor 205 or photodetector 206 can continuously provide signal 208 to DSP 214 which causes DSP 214 to identify a ROI 210 within a field of view (FOV) between 204A and 204B within system 200 in FIG. 2.

By either "powering on" the system 200 or a "system reset," a hardware Global_reset signal 701 is sent to DSP 214 of light scanning system 200 in FIG. 2. Prior to Global_reset signal 701, light scanning system 200 might not be in operation mode. Global_reset signal 701 automatically leads method 700 to the INACTIVE_FOV state 702.

Next at the INACTIVE_FOV state 702: INACTIVE_FOV state 702 is entered from Global_reset 701 or the Flush_DP state 710. Additionally, INACTIVE_FOV state 702 may be entered from step 704. According to some embodiments, almost all computation by DSP 214 is held in reset, and, after a short delay, these computations may be suspended to conserve power. The optical scanner position, Az signal 208, is fed to DSP 214 via a signal line.

At step 703, if Az signal 208 is greater than a predetermined value of LSYNC_AZ threshold (e.g. Threshold 521 in FIG. 5B), and if the synchronization-request signal, lsync_req, corresponds to logic 0 during this scan-line, method 700 transitions to the LSYNC state 704. Otherwise, method 700 moves to step 705. At step 705, if the optical scanner's current azimuth and elevation is within ROI 210, method 700 moves to the ACTIVE_ROI_WAIT state 706 when the laser-modulation (as exemplified by $f_Fm(t)$ 513 in FIG. 5B) reaches its midpoint phase (e.g., halfway thru_period). At this point, method 700 sets the line-synchronization-request signal ("lsync_req" in FIG. 7) to logic 0. Otherwise, method 700 will loop back to step 702.

At the LSYNC state 704: A line-synchronization-request signal, lsync_req, is set to logic 1. This signal, as exemplified as trigger signal 523 in FIG. 5B, is fed to the laser modulator circuit (which may be a part of Optical Drivers 103 of FIG. 1). The signal of lsync_req causes the laser modulation circuit to start a new modulation period. Method 700 then waits in this LSYNC state 704 for a delay of at least two modulation-periods, for the phase-reset to take effect. Then it returns to the INACTIVE_FOV state 702 at the start of the third modulation phase.

Next at the ACTIVE_ROI_WAIT state 706: This is the state before the optical scan moves inside ROI 210.

Next at step 707, if the Az 208 position falls outside of the ROI, method 700 returns in the INACTIVE_FOV state 702. Otherwise, after a short delay, the functions of DSP 214 are re-enabled and, at the start of a new modulation period, method 700 moves to the ACTIVE_ROI state 708.

Next at the ACTIVE_ROI state 708: This is the normal fully-operating state when the optical scan is within ROI 210. Method 700 remains in this state, during which DSP 214 processes raw data, collected by Optical Processing System 202, into valid point-cloud data which is then fed to LiDAR control system 110 in FIG. 1. When at step 709, the optical scanner position falls outside of ROI 210, method 700 enters the FLUSH_DP state 710.

Next at the FLUSH_DP state 710: This state is a simple delay to provide extra time to DSP 214 to complete unfinished computations, if any. During this state, new data from the optical receiver is blocked from entering DSP 214. This fixed delay (Delay n period in 710 of FIG. 7) is the time required to complete all of calculations from the received raw data. After all raw data will have been transformed into valid point-cloud data, method 700 returns to the INACTIVE_ROI state 702. Clearly the amount of time delay in the FLUSH_DP state 710 depends on the requirements from the DSP computation and the processing speed of DSP 214. With faster DSP's or other logic circuits, this delay can be zero.

In the LSYNC state 704, it is noted that method 700 waits in the LSYNC state 704 for a delay of at least two modulation-periods, for the modulator phase-reset to take effect. This allows the laser-modulator to transition to the new phase in a glitch-free manner, with no modulation truncated below one-half of nominal period, and no chirp extended beyond 1.5 times nominal modulation-period. However, a person having ordinary skill of the art would understand that similar but different delay considerations may be applied based on the light sources in use to achieve the intended purposes.

It should be appreciated that method 700 is only for illustrative purposes and embodiments of the present disclosure or not limited.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous wave (FMCW) lidar system, comprising:
   an optical source to transmit an optical beam modulated to transmit an FMCW optical signal at a first periodicity;
   an optical scanner to scan a field of view (FOV) relative to said light scanning system according to a second periodicity; and
   a processor to send a signal to cause a synchronization between said first periodicity and said second periodicity to produce an aligned set of scan points between a first set of scan points and a second set of scan points, wherein said signal is sent before said optical scanner scans a region of interest (ROI) within said FOV, wherein said processor is further configured to perform computation based on a portion of said FMCW optical signal.

2. The FMCW lidar system of claim 1, wherein said processor is further to reduce power consumption of one or more components of said light scanning system, provided said optical scanner scans outside said ROI.

3. The FMCW lidar system of claim 1, wherein said aligned set of scan points comprises an alignment between a first set of scan points forming a first scan line from plurality of scan points produced from said optical beam and a second set of scan points forming a second scan line from said plurality of scan points.

4. The FMCW lidar system of claim 1, wherein said processor is further configured to send said signal once for said first scan line and once for said second scan line.

5. The FMCW lidar system of claim 1, wherein said signal is further configured to cause said synchronization through an updated chirp periodicity applied to said first periodicity.

6. The FMCW lidar system of claim 1, wherein said optical scanner comprises a rotating prism.

7. The FMCW lidar system of claim 1 further comprising:
   a position sensor for sensing said optical beam, said position sensor to communicate sensor information to said processor; and
   where said signal is based on said sensor information.

8. A method comprising:
   transmitting an optical beam modulated to transmit an FMCW optical signal at a first periodicity;
   scanning a field of view (FOV) relative to a light scanning system according to a second periodicity;
   sending a signal to cause a synchronization between said first periodicity and said second periodicity to produce an aligned set of scan points between a first set of scan points and a second set of scan points, wherein said signal is sent before said optical scanner scans a region of interest (ROI) within said FOV; and
   performing computation based on a portion of said FMCW optical signal.

9. The method of claim 8, wherein said aligned set of scan points comprises an alignment between a first set of scan points forming a first scan line from a plurality of scan points produced from said optical beam and a second set of scan points forming a second scan line from said plurality of scan points.

10. The method of claim 8, further comprising:
    reducing power consumption of one or more components, provided said optical beam scans outside said ROI.

11. The method of claim 8, further comprising:
    increasing power consumption of one or more components, provided said optical beam scans within said ROI.

12. The method of claim 8, wherein said signal is sent once for said first scan line and once for said second scan line.

13. The method of claim 8, wherein directing said optical beam further comprises using a rotating prism.

14. The method of claim 8, wherein said signal is based on a sensor information communicated from a position sensor for sensing said optical beam.

15. A frequency modulated continuous wave (FMCW) lidar system, comprising:
    an optical source to transmit an optical beam modulated to transmit an FMCW optical signal at a first periodicity;
    an optical scanner to scan a field of view (FOV) relative to said light scanning system according to a second periodicity;
    circuitry coupled to said optical source and said optical scanner, said circuitry to:
    send a signal to cause a synchronization between said first periodicity and said second periodicity to produce an aligned set of scan points between a first set of scan points and a second set of scan points, wherein said signal is sent before said optical scanner scans a region of interest (ROI) within said FOV, and
    perform computation based on a portion of said FMCW optical signal.

16. The FMCW lidar system of claim 15, wherein said aligned set of scan points comprises an alignment between a first set of scan points forming a first scan line from a plurality of scan points produced from said optical beam and a second set of scan points forming a second scan line from said plurality of scan points.

17. The FMCW lidar system of claim 15, wherein said circuitry is further to reduce power consumption of one or more components of said FMCW lidar system, provided said optical scanner scans outside said ROI.

18. The FMCW lidar system of claim 15, wherein said circuitry is further configured to send said signal once for said first scan line and once for said second scan line.

19. The FMCW lidar system of claim 15, wherein said signal is further configured to cause said synchronization through an updated chirp periodicity applied to said first periodicity.

20. The FMCW lidar system of claim 15, wherein said optical scanner comprises a rotating prism.

* * * * *